Dec. 12, 1967     D. KRIEGER     3,357,183
MASTER CYLINDER
Filed Oct. 10, 1966
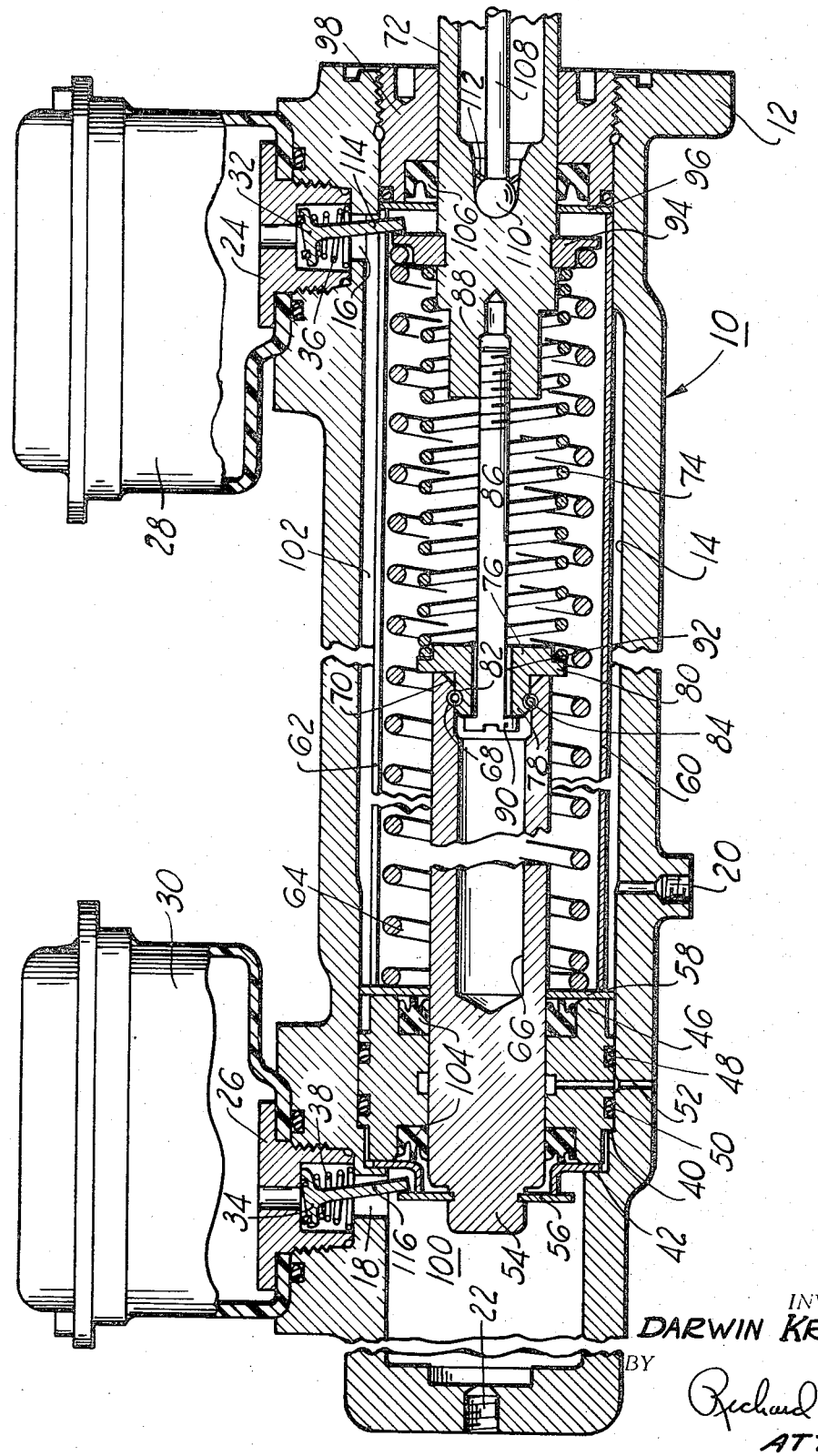
INVENTOR.
DARWIN KRIEGER
BY
Richard G. Geib
ATTORNEY

United States Patent Office 3,357,183
Patented Dec. 12, 1967

3,357,183
MASTER CYLINDER
Darwin Krieger, St. Joseph, Mich., assignor to The Bendix Corporation, a corporation of Delaware
Filed Oct. 10, 1966, Ser. No. 585,541
8 Claims. (Cl. 60—54.6)

ABSTRACT OF THE DISCLOSURE

A compact split-system type master cylinder for providing separate fluid pressures to separate portions of a vehicle's braking system having a caged connecting spring between primary and second fluid pressure generating means with a return spring maintaining a released position of the generating means about the connecting spring arrangement.

---

It has been observed that with the ever increasing demand for greater fluid displacement for the operation of vehicular brakes that master cylinder construction have been proposed which are enormous in size, complex in operation and therefore expensive to manufacture. It is a primary object of this invention to eliminate the aforementioned problems.

It is a more detailed object of this invention to provide a split-system type master cylinder with a single return spring to reduce the overall length of the master cylinder and the complexity of the internal arrangements thereof.

A still more detailed object of this invention is to provide a caged spring connection between the various fluid displacement members in a split-system type master cylinder that employs a dual purpose spring retainer that not only cages the spring connection but connects the front and rear displacement members of the master cylinder.

Other objects and advantages of this invention will appear from a description of the drawing showing a cross-sectional detail of a displacement type split-master cylinder in accordance with the principles of my invention.

More particularly, there is shown a split-system master cylinder 10 having a housing 12 which is provided with a longitudinal bore 14. As seen in the drawing, this bore is provided with inlet ports 16 and 18 and outlet ports 20 and 22 spaced one from the other. The housing is tapped adjacent the inlet ports 16 and 18 to receive valve fittings 24 and 26, respectively, for mounting fluid reservoirs 28 and 30. The valve fittings, upon assembly to the housing 12 position tilt valves 32 and 34 over conical springs 36 and 38 compressed by the fittings 24 and 26 between the valves 32 and 34 and the housing 12 over the inlet openings 16 and 18.

The bore 14 within the housing 12 is provided with shoulders 40 and 42 adjacent its closed end. A return stop 44 is then held against the shoulder 42 by a collar 46 that is provided with a flange for abutting the shoulder 40 of the bore. The collar 46 is provided with a pair of annular seals 48 and 50, and the housing is radially drilled as at 52 to provide a fluid bleed between the seals 48 and 50.

Prior to assembly within the bore 14 the collar 46 and return stop 44 are placed over the front fluid displacement member 54 behind a flange 56 formed by mounting a plate to the displacement member 54. Immediately behind the collar a bearing plate 58 is assembled to the displacement member 54 and a sleeve 60 is placed thereagainst. The sleeve 60 is provided with a slotted portion 62 along its uppermost side, as viewed in the drawing. Next a return spring 64 is placed within the sleeve 60 to rest against the plate 58.

The front fluid displacement member 54, prior to the above assembly, is hollowed out as at 66, an an annular groove 68 is machined internally of the hollowed portion immediately behind a tapered ramp 70 in the open end thereof.

Next, a rear fluid displacement member 72 is provided with a caged spring assembly comprising a spring 74 and a hat-shaped spring retainer 76 having a crown portion 78 and a brim 80 with a groove 82 within which is inserted a snap ring 84. A bolt 86 is then threaded within a tapped opening 88 in the rear fluid displacement member 72. When its head 90 abuts the crown portion 78 of the spring retainer 76 about an axial opening 92, it then is tightened until the proper spring height is achieved.

The rear fluid displacement member 72 is then assembled to the front fluid displacement member 54 by inserting the crown portion 78 of the spring retainer 78 within the hollowed portion 66 and causing the retainer ring 84 to be compressed within the groove 82 by the ramp 70 and thereafter expanded outwardly into the groove 68 to mechanically unite the members 54 and 72. It should be noted that the rear displacement member 72 is provided with a radial flange 94 against which the spring 74 bears. This radial flange 94 also serves as a bearing plate for the return spring 64.

The assembled fluid displacement members 54 and 72 along with the return stop 44, the collar 46 and the sleeve 60 are now ready for assembly into the bore 14. This is accomplished by inserting them within the bore until the return stop 44 and the collar 46 abuts the shoulders 42 and 40 and then placing a plate 96 against the sleeve 60 by means of threading a plug 98 into the threaded open end of the bore 14 for the housing 12. At this point there is created within the bore 14 a front chamber 100 and a rear chamber 102 whose integrity is maintained by two inner seals 104 in the collar 46 and a seal 106 in the plug 98. A push rod 108 is operatively connected by press-fitting is spherical end 110 beyond a spring retainer 112 in the rear displacement member 72. This push rod is, as will be readily appreciated by those skilled in the art, operatively connected to a brake pedal (not shown) that is, under the control of the vehicle operator. Before passing on to the operation, it should be noted that stems 114 and 116 of the tilt valves 32 and 34, respectively, are controlled by the flanges 56 and 94 of the front displacement member 54 and the rear displacement member 72 so that in the rest position flanges 56 and 94 hold valves 34 and 32 open to permit communication between the reservoirs 28 and 30 and the chambers 100 and 102, respectively.

In operation, the vehicle operator will depress the brake pedal (not shown) to cause the push rod 108 to move to the left with respect to the drawing and thereby carry the rear displacement member 72 inwardly of the rear chamber 102. This will cause the flange 94 to compress the caged spring 74 as well as the return spring 64, and the caged spring 74 will apply force to the front displacement member 54 to move it with member 72 inwardly with respect to chambers 100 and 102. As the flange 56 moves off the stop 44 with simultaneous movement in the same direction of the flange 94, the stems 116 and 114, respectively, will, because of the action of the conical springs 36 and 38, follow up the movement of the displacement members 72 and 54. After sufficient stroking of the members 72 and 54, the valves 32 and 34 will simultaneousy close the fluid communication between the reservoirs 28 and 30 with the chambers 102 and 100. Thereafter the displacement members 72 and 54 will displace fluid from the chambers 102 and 100 through the outlets 20 and 22 to the vehicular brake system (not shown).

Upon release of the brake pedal by the vehicle operator the return spring 64 will now take over to act upon the flange 94 to return the rear displacement member 72. During the actuation of the displacement members 72 and 54, and depending upon the loading of the caged spring 74, the head 90 of the bolt 86 will move away from the spring retainer 76 in some cases. In other cases the loading of the spring 74 may be such as to eliminate this moment of the head 90. In any event, the return spring 64 acting upon the flange 94 will cause the bolt head 90 to contact the spring retainer 76. As the retainer ring 84 mechanically unites the spring retainer 76 to the rear portion of the front displacement member 54, the return spring 64 will therefore return the front displacement member 54 along with the return of the rear displacement member 72 until the plate 56 abuts the stop 44 in which position the plate 56 and the flange 94 again contact the stems 116 and 114 to open the communication between the reservoirs 30 and 28 with the chambers 100 and 102. This will provide for return flow from the chambers 100 and 102 to the reservoirs as well as the replenishing of the fluid chambers 100 and 102 by the reservoirs 30 and 28.

Having recited a prefered embodiment of the invention, it is now intended to set forth all modifications as being recited by the appended claims.

I claim:

1. A master cylinder having a primary chamber and a secondary chamber with a primary fluid displacing means and a secondary fluid displacing means with means to operatively connect said primary and secondary means so that they may be operated to generate separate fluid pressures from said primary chamber and said secondary chamber, said means to operatively connect said displacement means being characterized by the following members comprising combinations:
   a first spring retainer affixed to said primary means;
   a second spring retainer operatively connected to said secondary means;
   a spring operatively arranged between said first and said second retainers;
   an adjusting means for preloading said spring, which adjusting means is operatively connected to said primary means so as to be variable in length; and
   a means to operatively connect said adjusting means to said second means including a snap ring between a groove in a bore internally of said secondary fluid displacing means within which a head of said adjusting means is slidable and a groove in said second spring retainer to permit independent pressurization of said primary chamber and said secondary chamber and maintain a pulling connection between said primary and secondary means for return of same upon depressurization of said primary and secondary chambers.

2. A master cylinder having a primary chamber and a secondary chamber with a primary fluid displacing means and a secondary fluid displacing means with means to operatively connect said primary and secondary means so that they may be operated to generate separate fluid pressures from said primary chamber and said secondary chamber, said means to operatively connect said displacement means being characterized by the following members comprising in combination:
   a first spring retainer affixed to said primary means;
   a second spring retainer operatively connected to said secondary means;
   a first spring operatively arranged between said first and second retainers;
   an adjusting means for preloading said first spring, which adjusting means is operatively connected to said primary means so as to be variable in length;
   a means to operatively connect said adjusting means to said secondary means including a snap ring within a groove in a bore internally of said secondary means within which a head of said adjusting means is slidable to permit independent pressurization of said primary chamber and said secondary chamber while maintaining a pulling connection between said primary secondary means for return of same upon depressurization of said primary and secondary chambers; and
   a second spring in said primary chamber operatively arranged to bias said primary fluid displacing means to a released position, which because of said means operatively connecting said primary means to said secondary means also maintains said secondary fluid displacing means in its released position.

3. A master cylyinder comprising:
   a housing having axailly aligned front and rear chambers each of which have inlet and outlet ports;
   sealing means separating said front and rear chambers;
   a rear fluid displacement member operatively arranged in the rear chamber to be controlled by an operator-operated member;
   a return spring operatively arranged between said rear member and said housing for normally positioning said rear member adjacent the rear end of said rear chamber;
   a front fluid displacement member operatively arranged in said housing to have a forward portion in said front chamber and a rear portion in said rear chamber, said rear portion being of tubular construction having an open end with an annular groove within the tubular construction adjacent said open end; and
   a caged spring assembly operatively connecting said rear displacement member to said rear portion of said front displacement member, said caged spring assembly having a hat-shaped spring retainer whose crown has a peripheral groove within which a retainer ring is mounted, said crown being of an outside diameter so as to loosely fit within the open end of said rear portion and being held thereto by the expansion of said snap ring into said annular groove after the brim abuts said rear portion, said spring retainer having an axial opening through which a headed adjusting member is mounted to said rear displacement member to vary the height of a spring operatively arranged between said spring retainer and said rear displacement member whereby an operating force on said rear member displacing it inwardly in said rear chamber will mechanically actuate said front member in said front chamber in a similar manner to close off said inlet ports into both front and rear chambers and displaced fluid from same via said outlet ports in said front and rear chambers and release of said force will free said return spring to push said rear member and pull said front member to their rest position.

4. A master cylinder according to claim 3 wherein said open end of said rear portion is tapered inwardly to facilitate compression of said retainer ring into the groove in said crown upon press fitting said spring retainer to said rear portion.

5. A master cylinder according to claim 4 wherein said annular groove is oversized to permit said retainer ring to expand to its free diameter when said brim abuts said rear portion and thereby mechanically link said spring retainer to said rear portion.

6. A master cylinder according to claim 5 wherein said adjusting member is a bolt whose head is larger than the opening through said spring retainer which bolt is threadedly secured to said rear member in a tapped opening thereof.

7. A master cylinder according to claim 6 wherein said retainer ring is a wire ring whose cross sectional diameter is such as to permit press fitting of said spring retainer to said rear portion and expandable to engage edges of the annular groove and the peripheral groove to mechanically unite said spring retainer and said rear portion of said front member.

8. A master cylinder according to claim 3 and further comprising:
   tilt valve means in each of said inlet ports operably connected to said rear displacement member and said front displacement member; and
   reservoir means in fluid communication with said inlet ports which fluid communication is controlled by said tilt valve means to replenish fluid in said front and rear chambers and permit return flow therefrom as said return spring returns said members to operate said valves.

References Cited
UNITED STATES PATENTS

| | | | |
|---|---|---|---|
| 1,943,886 | 1/1934 | Carroll | 60—54.6 |
| 3,147,596 | 9/1964 | Wallace | 60—54.6 |
| 3,191,385 | 6/1965 | Mamoru Watanabe | 60—54.6 |
| 3,292,371 | 12/1966 | Belart | 60—54.6 |

MARTIN P. SCHWADRON, *Primary Examiner.*

ROBERT R. BUNEVICH, *Examiner.*